Figure 1:
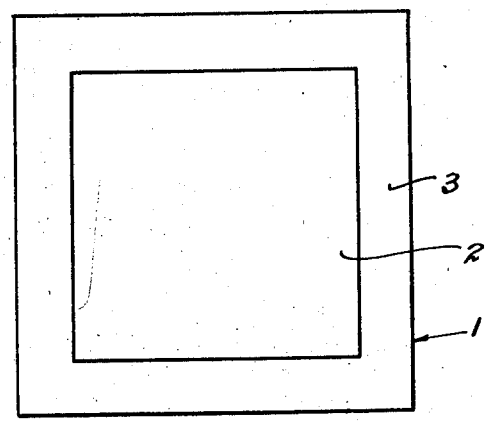

May 29, 1945.  L. D. KESLAR  2,377,084

LAMINATED GLASS UNIT

Original Filed Nov. 5, 1940

Inventor
L. D. KESLAR

By Olen E Bee
Attorney

Patented May 29, 1945

2,377,084

UNITED STATES PATENT OFFICE 2,377,084

LAMINATED GLASS UNIT

Leroy D. Keslar, Tarentum, Pa., assignor to Pittsburgh Plate Glass Company, Allegheny County, Pa., a corporation of Pennsylvania Original application November 5, 1940, Serial No. 364,437. Divided and this application November 19, 1942, Serial No. 466,156

3 Claims. (Cl. 154—2.74)

This invention relates to safety glass and it has particular relation to laminated glass in which reinforcing plastic interlayer material extends beyond the covering glass plates to form a flexible mounting border.

The invention described and claimed herein constitutes a division of my application, Serial No. 364,437, filed November 5, 1940.

One object of the invention is to provide an improved structure of laminated glass having a mounting border of plastic material projecting therefrom which is capable of direct connection to a support independently of contact of such support with the glass.

Another object of the invention is to provide a multi-plate laminated unit having a built-up mounting border capable of supporting the unit yieldably in a surrounding frame.

Safety glass comprising a plurality of glass plates bonded together into the form of a composite unit by interposed layers of plastic is well known. Modern streamlined structures, however, involve several new problems of positioning safety glass in order that it will lie substantially flush with the surface of a vehicle in which it is installed. In instances where the safety glass unit is mounted in a frame, which in turn is secured to the walls of a supporting structure, it will be apparent that there will be portions projecting beyond the surface of the vehicle wall, or the glass unit will be offset inwardly from such surface. In either event, the air stream passing over the glazed portion of a vehicle will be interrupted and will result in an increased air resistance accompanied by a loss of efficiency.

Other problems which confront the engineers and designers involve disadvantages arising from clamping the marginal portions of glass incidental to mounting them in supporting structure. When conventional laminated glass is supported in a frame, flexing or movement of the supporting structure places an undue strain upon the glass, with the result that considerable breakage of the glass is likely to occur. These disadvantages are obviated by the provision of a laminated glass unit having a border of plastic material adapted to be positioned in a supporting structure that is fastened directly to the plastic border. Special forms of the border structure are proposed according to this invention.

Figure 4:
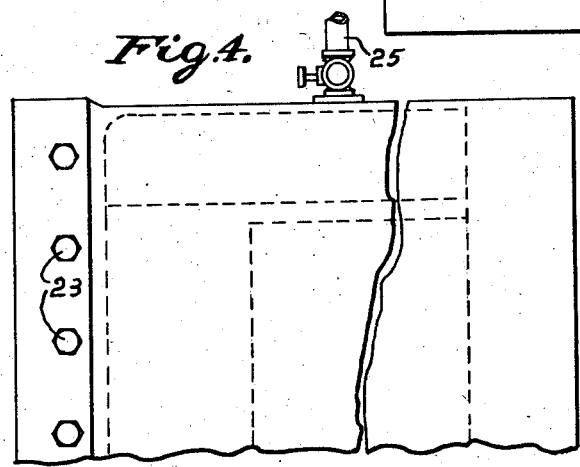
Figure 5:
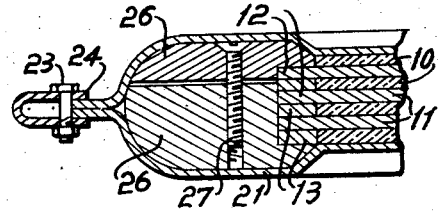
Figure 2:
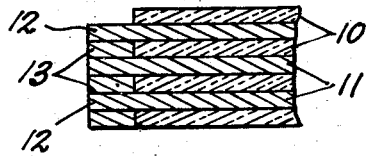
Figure 3:
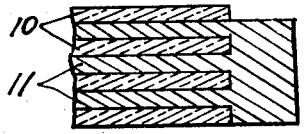

In the drawing:

Fig. 1 is a plan of a laminated glass unit; Fig. 2 is a cross section of a laminated unit; Figs. 2 and 3 are fragmentary cross sections of multiplate laminated units; Fig. 4 is a fragmentary plan of a bag for holding the unit; and Fig. 5 is a fragmentary cross section of a multiplate unit with frames and bag applied thereto.

As shown in Figs. 1 to 3, the principles of my invention are applied to a multi-plate laminated glass unit 1 which includes a central transparent area 2 and 2 mounting border or flange 3. A plurality of glass plates 10 are united by intermediate layers 11 of plastic material which extend beyond the edges of the plates 10 to form lips 12. The spaces between the lips 12 are filled by strips 13 of plastic and the several parts of extended plastic form the border 3 around the assembly.

In positioning the laminated plates in a vehicle, suitable securing means, such as bolts, are passed through the plastic borders of the plates at spaced intervals and fastened to the vehicle frame. It is intended that the glass laminae be kept free from metallic contact to reduce any possibility of strains or local stresses therein. Thus the plastic border portions 12—13 and 3, in effect constitute flexible mounting flanges which are adapted to be clamped tightly for supporting the unit without imposing strains or stresses upon the glass plates.

In this illustrative example of a laminated unit as contemplated by my invention the assembly is placed in a rubber bag 21. Suitable closure elements 23 and 24 are included with the bag to confine the laminated unit therein. The bag is evacuated through a conduit 25 and subjected to heat and pressure sufficient to bond the separate elements of the assembly into a composite unit.

Before the laminated unit, as illustrated in Figs. 4 and 5, is placed in the bag 21, molding frames 26 are positioned around the assembled unit of glass and plastic. The projecting portions or borders 12 and strips 13 of the plastic material are embraced by the frames which are assembled by bolting their elements together as indicated at 27. Heat and pressure are applied to the assembly of laminated unit, frames and bag in a chamber in the manner described in the application referred to above to weld or fuse all of the plastic elements into a unitary mass.

Consideration has been given to the fact that difficulties will be experienced in assembling multi-plate units and aligning properly the glass laminae when the interposed plastic sheets are of greater dimensions than the glass. It is possible to assemble the glass and plastic in the ordinary manner and position plastic strips of suitable thickness and width about the assembly. Subsequent lamination under heat and pressure will not only unite the glass and plastic interlayers but will also join the plastic strips to the interlayers to form an integral projecting border.

Manifestly it is necessary that the plastic material forming the interlayer of the laminated glass be susceptible to flow when heat and pressure are applied thereto. At the same time too much plasticity will weaken the final structure. The vinyl acetal resins, and particularly vinyl butyral, are preferred. At the same time, however, the acrylate resins and other thermo-plastic resins ordinarily used in safety glass may be employed if desired. It is also possible to use a composite interlayer wherein a central stratum of a hard resin is covered with softer thermoplastic materials. This type of interlayer will insure greater strength in the projecting borders of the plate. The lamination operation follows the standard practices so well known that it is not considered necessary to set them forth in great detail. Obviously the pressure and temperature to which the assembled units are subjected will vary with the types of plastic materials utilized.

Although structure illustrative of the invention has been shown and described in detail, it will be apparent to those skilled in the art that the invention is not so limited, but that various changes can be made therein without departing from the spirit of the invention or from the scope of the appended claims.

I claim:

1. In a closure structure for an opening in a wall, two interlayer sheets of flexible organic plastic disposed in parallel relation, plates of glass disposed between and on outer sides of the interlayer sheets and secured thereto in bonded relation to form a laminated panel of superposed plastic and glass layers, said interlayer sheets extending beyond the edges of the glass plates and integrally joined in the form of a substantially flat mounting flange of plastic adapted to yieldably receive panel clamping members beyond and free of contact with the edges of the glass, the edges of the glass plates also being in bonded relation to the extended mounting flange of plastic.

2. In a closure structure for an opening in a wall, at least three glass plates disposed in spaced superposed relation, interlayer sheets of flexible organic plastic filling the space between adjacent glass plates and secured thereto in bonded relation to form a laminated panel, said interlayer sheets extending beyond the edges of the glass plates and including between extended planes of said plastic sheets an additional body of plastic integral with said sheets to form a substantially flat mounting flange having a thickness equal substantially to the thicknesses of said interlayer sheets plus the thickness of an intervening glass plate and adapted to yieldably receive panel supporting clamping members beyond and free from contact with the glass, the additional portion of the thickened plastic flange abutting the edge of said intervening glass plate and secured adherently to the latter edge.

3. A laminated glass structure comprising two sheets of glass and an interposed layer of thermoplastic adherent to the glass sheets, the area of the thermoplastic layer being enough greater than the area of each glass sheet so that it extends beyond the edges of the glass sheets to an extent sufficient to provide a flexible attaching flange, said plastic being shaped to contact with one face of each sheet of glass and the edges of both sheets and adherent thereto.

LEROY D. KESLAR.